United States Patent
Cervello (10) Patent No.: US 10,793,168 B2
(45) Date of Patent: Oct. 6, 2020

(54) PROTECTING ELEMENT OF A RAILWAY WHEEL SET AND RESPECTIVE MANUFACTURING METHOD

(71) Applicant: LUCCHINI RS S.P.A., Lovere (BG) (IT)

(72) Inventor: Steven Cervello, Lovere (IT)

(73) Assignee: LUCCHINI RS S.P.A., Lovere (BG) (IT)

( * ) Notice: Subject to any disclaimer, the term of this patent is extended or adjusted under 35 U.S.C. 154(b) by 116 days.

(21) Appl. No.: 16/321,942

(22) PCT Filed: Aug. 2, 2017

(86) PCT No.: PCT/IB2017/054727
§ 371 (c)(1),
(2) Date: Jan. 30, 2019

(87) PCT Pub. No.: WO2018/025198
PCT Pub. Date: Feb. 8, 2018

(65) Prior Publication Data
US 2019/0161098 A1    May 30, 2019

(30) Foreign Application Priority Data

Aug. 3, 2016   (IT) ................................ 10201681794

(51) Int. Cl.
*B60R 19/00*    (2006.01)
*B61F 19/02*    (2006.01)

(52) U.S. Cl.
CPC .................................. *B61F 19/02* (2013.01)

(58) Field of Classification Search
CPC .... B60B 2310/305; B60D 1/00; B60D 1/143; B60D 1/145; B60D 1/486;
(Continued)

(56) References Cited

U.S. PATENT DOCUMENTS

| | | | | |
|---|---|---|---|---|
| 1,709,836 A | * | 4/1929 | Buckwalter | ............. B60B 37/04 |
| | | | | 105/218.1 |
| 2,747,918 A | * | 5/1956 | Blackwood | ............. B60B 37/08 |
| | | | | 295/36.1 |

(Continued)

FOREIGN PATENT DOCUMENTS

| DE | 102010009437 A1 | 8/2011 |
|---|---|---|
| DE | 202014002014 U1 | 3/2014 |

(Continued)

*Primary Examiner* — Kiran B Patel
(74) *Attorney, Agent, or Firm* — Volpe and Koenig, P.C.

(57) ABSTRACT

A protecting element of railway wheelsets is described, the protecting element being constituted by a pad provided with a plurality of transversal grooves without which the pad could not be rolled up on the axle at room temperature. The pad is made of a material having high thickness or high strength, that is respectively between 5 mm and 10 mm and between 50 kJ/m² and 80 kJ/m². Thanks to the combination of thickness and resilience values, in addition to the grooves, the pad can be manually rolled up on the axle, without the aid of presses and without prior heating. Thus, the solution according to the present invention combines the advantages of ease of installation, such as the possibility of manually rolling up the protecting element on the axle, with the effectiveness of the protection provided by rigid protecting elements.

23 Claims, 4 Drawing Sheets

(58) Field of Classification Search
CPC ......... H01L 2924/0002; H01L 2924/00; A63C 17/06; B60G 11/04; B60G 2202/112
See application file for complete search history.

(56) References Cited

U.S. PATENT DOCUMENTS

| | | | | |
|---|---|---|---|---|
| 4,915,436 | A * | 4/1990 | Jaus | B60B 17/00 105/1.1 |
| 6,568,333 | B1 * | 5/2003 | Kontio | B61F 5/50 105/218.1 |
| D727,207 | S * | 4/2015 | Anderson | D12/42 |
| 9,315,072 | B2 * | 4/2016 | Lubben | B61F 5/50 |
| 2002/0098051 | A1 * | 7/2002 | Porto | B60P 7/12 410/32 |
| 2009/0206623 | A1 * | 8/2009 | Blasingame | B61F 3/08 295/37 |
| 2012/0319420 | A1 * | 12/2012 | Meyer | B60B 17/0034 295/36.1 |
| 2017/0106881 | A1 * | 4/2017 | Cantini | G01M 17/10 |
| 2019/0309382 | A1 * | 10/2019 | Fajkos | B60B 17/0006 |

FOREIGN PATENT DOCUMENTS

| | | | |
|---|---|---|---|
| EP | 1508455 | A1 | 2/2005 |
| EP | 2345491 | A | 7/2011 |
| WO | 0059764 | A1 | 10/2000 |

* cited by examiner

PROTECTING ELEMENT OF A RAILWAY WHEEL SET AND RESPECTIVE MANUFACTURING METHOD

SCOPE OF THE INVENTION

The present invention is in the field/scope of railway vehicles and, in particular, relates to a protecting element to protect wheel sets during their transport and operation, and the respective manufacturing method.

STATE OF THE ART

In railway engineering, the expression "wheelset" is meant to identify the group of elements comprising two wheels and the corresponding connecting axis, or axle. Railway wheelsets support the railway vehicle, guiding it on the rails and transmitting driving and braking torques.

In high-speed railway vehicles, typically travelling in excess of 250 km/h, the axles of wheelsets are frequently hit by stones lifted from the railway roadbed as the vehicle passes by. In particular, stones constitute the so-called ballast, a well-known component of the railway equipment. The ballast lifting is caused by strong aerodynamic turbulences caused by the vehicle itself.

Another case of damage to the wheelset (regardless of the vehicle speed) occurs during cold winters, when ice or mud and rubble aggregates can accumulate on the bottom of the bogies of the railway vehicle. Sometimes, vibrations the railway vehicle is subject to cause the ice or aggregates to come off and fall on the ballast, thereby causing the lifting of the ballast and, as a result, further impacts against the axles. Even the ice accumulated on the bogie can come off and hit the axle.

The ballast or other aggregates striking against an axle can cause the protective paint usually covering the axle to locally come off and, in the worst cases, can cut the metal surface of the axle and contribute to the onset of corrosive phenomena and generation of fatigue cracks in the axle. This is a very dangerous circumstance because, potentially, a crack may lead to the structural failure of the axle, which can in turn lead to serious accidents.

As mentioned above, with the intention of providing protection, the axles are often painted with special protective paints applied on the surface of the axle so as to create a high thick layer that may reach several millimeters (up to about 8 mm). However, such paints are subject to partial detachments that must be always repaired. Another disadvantage is that due to the high thickness of the paint, the surface integrity of the axle cannot be checked with the magnetic method, unless the paint is completely removed.

Therefore, in the past, protecting elements as removable accessory of wheelsets have been proposed. These devices can be applied to the axles so as to coat them as a skin and absorb shocks, and can be easily removed so as to inspect the integrity of the axles themselves.

The protecting elements must withstand an impact energy that depends both on the mass of the stones, which on average can range from 200 g to 400 g, and the maximum vehicle speed, which in the case of a train may range from 120 km/h to 350 km/h.

The test defined by EN13261 uses, as impact bullet, a steel bullet which is, of course, harder than the stone and therefore would generate a greater damage with respect to the stone, the energy being equal. As part of the next revision of the standard, experts agreed that the test energy equivalent to that of a stone impacting on a vehicle traveling at 350 km/h would be 90 J. For lower speeds, such as 120 km/h, energy may drop to about 20 J.

These are the involved values which a protecting element has to deal with.

EP-A-2345491 and US 2012/0319420 describe solutions known in the art. The Applicant found some limitations of these solutions.

In particular, EP-A-2345491 describes a rigid, substantially cylindrical, protecting element consisting of two halves that can be fitted around an axle and coupled to each other by means of pipe clamps, so as to create a seamless protection on the outer surface of the axle. The two halves of the protecting element are preferably made of cross-linked polyethylene, named PEX. As shown in the respective FIG. 1, the two halves of the protecting element are provided with a plurality of ribs 191-194 circumferentially extending and inwardly protruding when the protecting element is correctly mounted, so as to create an air chamber between the axle and the protecting element itself, in order to facilitate air circulation and prevent moisture stagnation. To prevent this air chamber from being split into compartments by the ribs themselves, which can act as dividers, the ribs are provided with notches that allow air to pass in axial direction.

The just described solution, actually available on the market, has several disadvantages including the implementing cost. First, PEX is a relatively expensive material, especially as regard the use which the protecting element is intended for. In addition, to obtain the just described complex shape of the two halves, two or three molds are needed.

US 2012/0319420 describes a non-rigid protecting element made of an elastomeric material able to be rolled up, as a sheath, on the axle and to be fastened through a metal band. This is a very economical solution because no molds are needed to make the protecting element. However, the elastomeric element should have sufficient flexibility to be able to be manually rolled up on the axle, so either the thickness of the elastomer element must be small, less than 5 mm, or the material the elastomer element is made of must have low rigidity and therefore could hardly have enough strength. Generally, this type of protecting element has low strength, less than 50 kJ/m² (ISO 179 notched specimen).

The most obvious limit of this solution is that the sheath adheres to the axle and hinders air circulation; moisture can be trapped between the sheath and the axle, thus contributing to corrosion.

SUMMARY OF THE INVENTION

Therefore, it is an object of the present invention to provide a protecting element of the axle not only able to overcome the limits of known solutions but being also effective, easy to install and remove, and cost-effective.

Therefore, in a first aspect, the present invention relates to a protecting element according to claim 1 for an axle of a railway wheelset.

In particular, the protecting element is constituted by a pad provided with a plurality of transversal grooves without which the pad could not be rolled up on the axle at room temperature. This because the pad is made of a material having either high thickness or high strength, respectively between 5 mm and 10 mm and between 50 kJ/m² and 80 kJ/m². Therefore, if there were no grooves, a thick pad characterized by high strength could not be folded and rolled up on the axle, unless using presses and after heating.

Thanks to the combination of the specified values of thickness and strength as well as to the grooves, the pad can be manually rolled up, even at room temperature. Therefore, advantageously, the installation on the axle of the wheelset can be merely manually carried out by a single person, without the aid of presses or other complex machineries. At the same time, with respect to traditional solutions, the designer of the protecting element has more freedom to choose for the protecting element large thicknesses and/or particularly resilient materials. On the contrary, the protecting elements currently available on the market that meet the required toughness values also have high rigidity (700-1200 MPa), to the extent that the pad cannot be manually rolled up around the circumference of the axle (170-200 mm).

Another advantage is that the resilient and/or thick protecting element effectively protects the surface of the axle to such an extent that the axle can be painted with a classical paint at a reduced thickness of about 0.3 mm; in other words, large thicknesses of the paint are not needed, since the paint is only intended for corrosion protection: therefore, it is easily removable during great maintenance, making it easier to carry out the inspection of the axle through the magnetic method.

The specified thickness range allows both the protecting element to be manually folded without tools, and to prevent cuts of the metal surface of the axle otherwise caused by the impact with ballast, stones or ice, allowed by the inevitable deformation that the protecting element would undergo, even when the protecting element is itself not damaged.

By testing various materials, the Applicant found that toughness is the most important physical property to be considered in order to prevent the protecting element from breaking down as a result of the impact. In addition, the protecting element must maintain its toughness even at very low temperatures, down to −40° C., i.e. under climatic conditions where brittleness usually tends to increase. The protecting element according to the present invention fulfills these expectations.

Another great advantage, which will be explained in more detail below, concerns the constructional simplicity of the protecting element according to the present invention; in fact, to manufacture it there is no need to use molds or molding techniques, that basically have to be adapted each time to different geometries of the axle. The pad can be made simply by continuous rolling or drawing, and not in batch as it is for the molding: as a result, it has a basically universal shape and the adaptation to different geometries of the axle takes place simply during the assembly: in this way, production and logistics (stock management) costs can be reduced compared to traditional solutions.

Thus, the solution according to the present invention combines the advantages of ease of installation, such as the possibility of manually rolling up the protecting element on the axle, with the effectiveness of the protection provided by rigid protecting elements. In other words, the protecting element according to the present invention differs from the solution described in US 2012/0319420 because thickness or strength would not allow it to be simply rolled up as that document describes and, on the other hand, it can be produced with techniques other than molding, in a considerably cheaper way with respect to the solution described in EP-A-2345491.

In the preferred embodiment, the pad is made of a material having strength greater than 50 kJ/m$^2$ even at very low temperatures (−40° C.) without embrittlement; in combination with a thickness greater than 5 mm, for example about 8-10 mm, it can withstand point-shaped steel bullets with an impact energy of about 90 J within a temperature range of −40+70° C.

Preferably, the pad thickness is greater than 7 mm, more preferably about 10 mm.

A suitable material for making the pad is, for example, high density polyethylene HDPE.

Preferably, the transversal grooves are obtained in the inner surface of the protecting element, i.e. the surface intended to face the outer surface of the axle. Clearly, the grooves can also be made on the outer surface, but this solution would be less effective than the previous one, because mud and ice could accumulate in the grooves.

Preferably, the grooves leave a residual thickness of about 2-3 mm in the pad.

In the preferred embodiment, the transversal grooves are V-shaped, for example by an angle of about 20 degrees, and extend from side to side of the pad, orthogonally to its length.

Clearly, the grooves can also be diagonally made; as a result, the pad would tend to fold in spiral-shape. This is a particularly suitable solution to protect long surfaces of the axle and to facilitate water or moisture to be expelled by centrifuging them from the grooves to the outside.

In the embodiment with diagonal grooves, pipe clamps can only be applied to the ends; in this way, the pad can be made with limited thickness in the central part which is just intended to be rolled up with the axle at its center. This solution is particularly useful in cases where the pad is applied to drive wheelsets where the gearmotor assembly is very close to the axle and there is minimal space available for the installation of an axle protection.

In an embodiment, the ends are separated from the central portion of the pad and are interchangeable in order to obtain the maximum adaptability to the surfaces of the axle. Preferably, the ends can be at least partially overlapped to the pad in order to lock it on the axle; the ends, in turn, are locked by proper fastening means.

Preferably, the transversal grooves are parallel to each other and preferably evenly spaced, for example by 20 mm.

In the preferred embodiment on the inner surface of the pad there are a plurality of prominences. Their function is to lean against the outer surface of the axle, when the protecting element is properly installed, in order to define an air chamber between the axle and the protecting element itself. The air chamber is intended for facilitating air circulation so as to prevent moisture stagnation that could alter the paint of the axle and contribute to corrosion phenomena.

Preferably, the prominences are transversal ribs parallel to each other and in-between two consecutive transversal grooves. For example, between two consecutive grooves there can be one or more ribs.

In the preferred embodiment, the side edges of the pad are beveled or rounded; this feature allows the protecting element to adapt to the curved surfaces of the axle, such as those generally provided for radiusing cylindrical surfaces of different diameters, for example in the journal area.

If necessary, the pad may be provided with a plurality of through holes to allow the water to be discharged when the pad is rolled up on the axle. The holes can be arranged in series and connected by a special channel to distribute the water among the various holes.

Preferably, the protecting element is rolled up on the axle and secured by pipe clamps, metal bands or equivalent restraining systems.

Preferably, the ends of the pad have undercuts with complementary shape in order to overlap one to another, when the protecting element is assembled on the axle, the overall thickness remaining unchanged.

Preferably, the pad is made of a fire-resistant material. For example, in case of high density polyethylene, it can be filled with suitable fibers adapted to obtain such an effect.

A second aspect of the present invention relates to a method according to claim 14 to make an axle protecting element of a railway wheelset.

The method comprises the steps of:

(a) rolling or extruding a pad whose strength is between 50 kJ/m$^2$ and 80 kJ/m$^2$ and whose thickness is between 5 mm and 10 mm, preferably made of high-density polyethylene HDPE;

(b) making a plurality of grooves on the surface of the pad intended for facing the outer surface of the axle, wherein the grooves extend transversally with respect to the pad length and allow the pad to be manually folded, also by only one person, in order to be rolled up on the axle.

Making the pad by rolling or extrusion is much more cost-effective with respect to the molding technique described in the known art for high-thickness protecting elements. The pad can be continuously made, and not just in batches.

The grooves can be made by one or more milling cutters positioned in line with the rolling mill or extruder, with obvious advantages.

BRIEF DESCRIPTION OF THE DRAWINGS

Further characteristics and advantages of the invention will be more evident by the review of the following specification of a preferred, but not exclusive, embodiment, which is depicted for illustration purposes only and without limitation, with the aid of the attached drawings, in which.

DETAILED DESCRIPTION OF THE INVENTION

Figure 1:
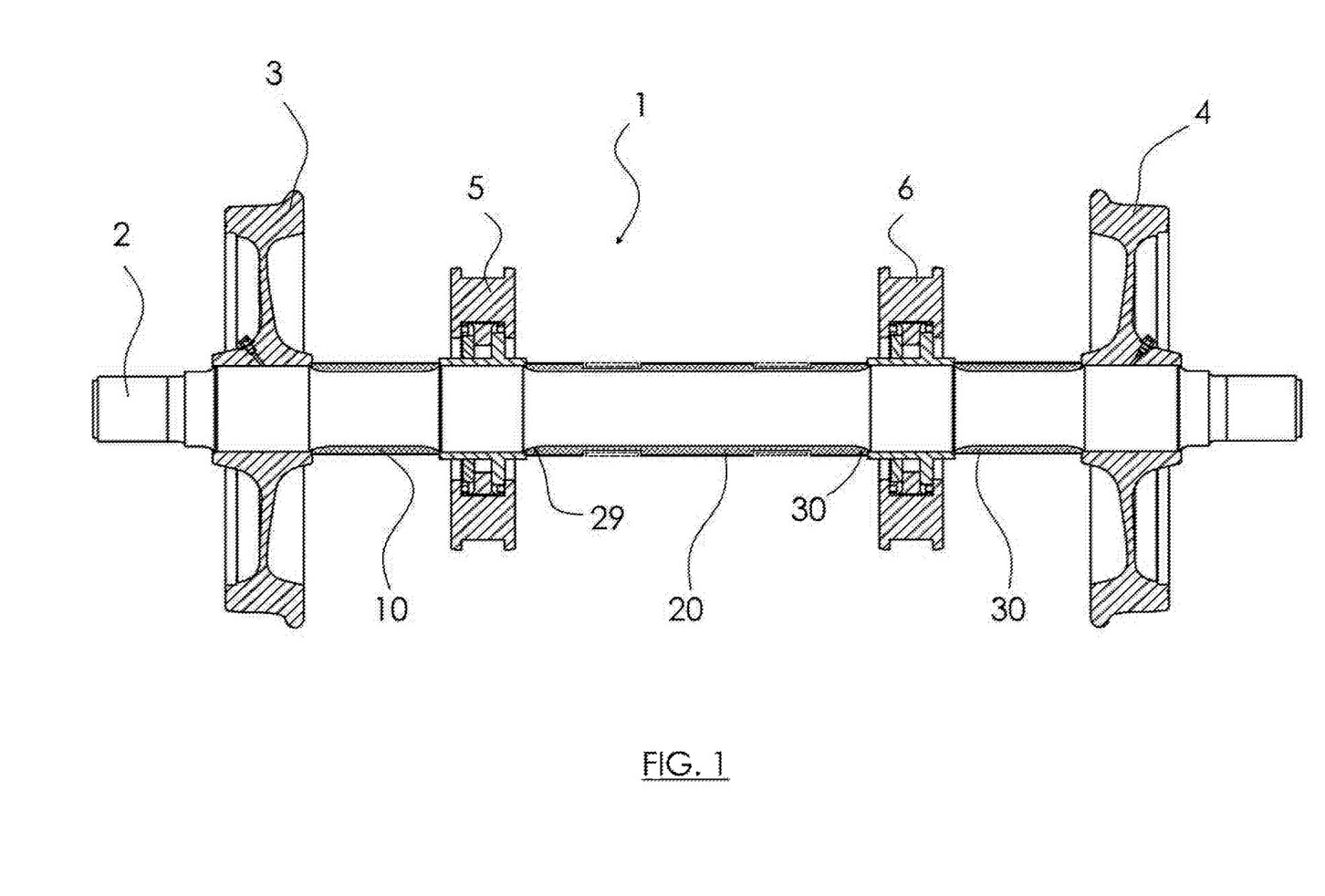
FIG. 1 is a partial axially-symmetrical sectional view of a wheelset provided with protecting elements according to the present invention.

FIG. 1 shows a wheelset 1 provided with an axle 2 on which brake discs 5 and 6 and two wheels 3 and 4 are seated (at the journals). An axially-symmetrical section of the wheels 3, 4 and the brake discs 5, 6 is shown, i.e. wherein the longitudinal axis of rotation of the wheelset 1 is within the section plane.

The protecting elements 10, 20 and 30 according to the present invention are rolled up on the entire free surface of the axle 2, i.e. the outer surface not coupled to other elements such as the wheels 3, 4 or the brake discs 5, 6, thus protecting the surface itself from impacts.

By using the protecting elements 10, 20 e 30, large amounts of protective paint on the axle 2 can be avoided; in fact, the axle 2 is effectively protected even by a light painting, where the thickness of the paint on the axle surface is about 0.3 mm, compared to the solutions of the known art which provide large thicknesses.

Figure 2:
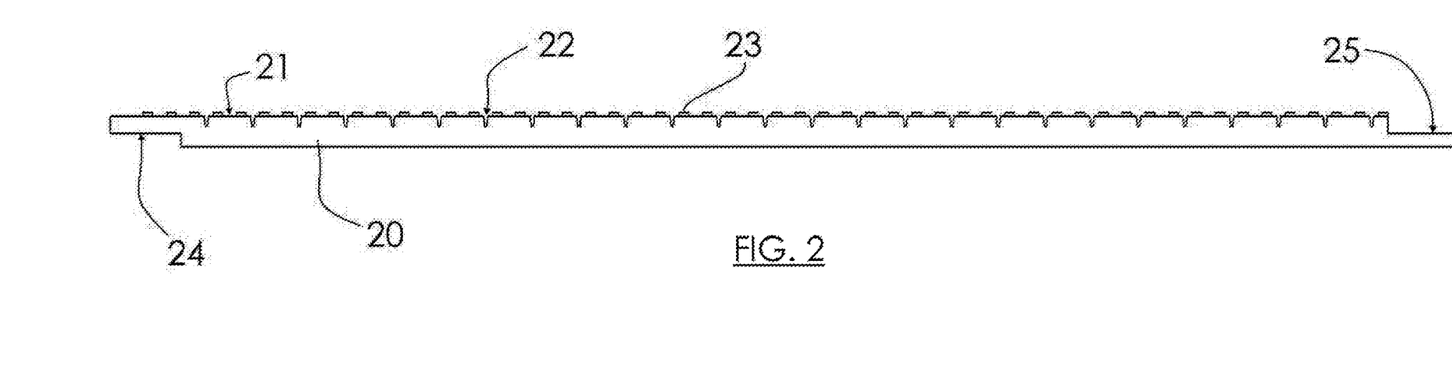
FIG. 2 is a side and elevation view of a protecting element according to the present invention.
Figures 3, 4:
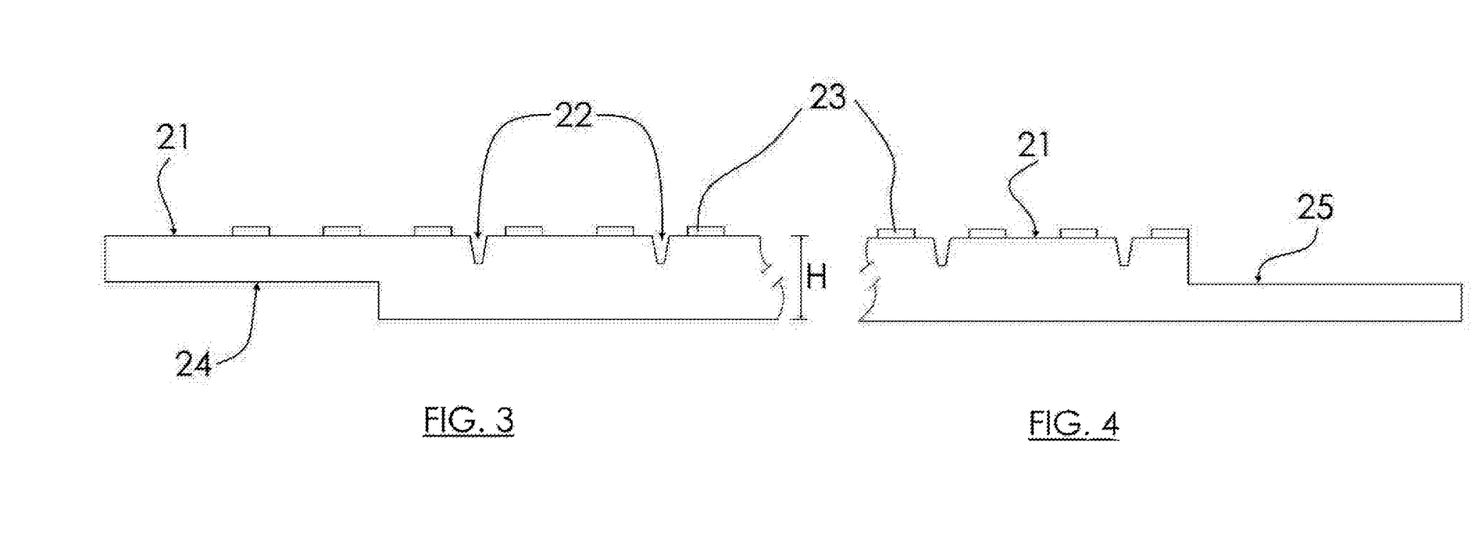
FIG. 3 is an enlarged view of the left end of the protecting element shown in FIG. 2.
FIG. 4 is an enlarged view of the right end of the protecting element shown in FIG. 2.

FIG. 2 laterally shows the protecting element 20; it is a fully lying pad, that is, seen in the direction of its length. FIGS. 3 and 4 respectively show enlargements of the left end and the right end of the protecting element 20 shown in FIG. 2.

What will be described here also applies to the other protecting elements 10 and 30.

The protecting element 20 has a thickness H between 5 mm and 10 mm, preferably about 8-10 mm, and is made of a material characterized by high strength even at very low temperatures, below −20° C. (typically −40° C.).

The notch sensitivity is measured by subjecting a specimen of the material to be examined (for example, a metal material or a plastic material), whose surface has a notch, to impact test by means of a pendulum-shaped drop hammer (an example of such a machinery is the Charpy pendulum), and is obtained directly by calculating the difference between the initial height (H) from which the pendulum is dropped and the maximum height h it reaches after breaking (all at once) the sample of the material subjected to measuring (fracture by impact-bending).

The pendulum strikes the specimen face opposite to that containing the notch. The energy absorbed by the specimen during the impact (measured in joule) is:

$$K = P \cdot (H-h)$$

where P is the pendulum weight and K is precisely the notch sensitivity expressed in J.

The notch sensitivity can also be calculated with the Izod impact test according to ASTM E-23. Both the Izod and the Charpy tests are carried out through an impact pendulum.

The protecting element 20 is made of material having high-strength, between 50 kJ/m$^2$ and 80 kJ/m$^2$.

For example, a suitable material is high-density polyethylene HDPE. This measure prevents the protecting element 20 from hardening and suffering damages, such as for example cracking or localized detachments, as a result of impacts against the ballast when the railway vehicle, and hence the axle 2, travels in an extremely cold environment.

Preferably, the material of the protecting element 20, by its nature, is fire-resistant according to current safety standards, for example in the European railway sector. High-density polyethylene with fire-resistance properties is available on the market. If a material having these characteristics is not available, the raw material just needs to be filled with suitable additives, i.e. additives increasing the fire-resistance properties of the polyethylene or the equivalent material chosen.

Due to its high strength, it would not be possible to roll up the protecting element 20 on the axle 2, unless through complex heat-preforming operations, by using presses, at the expense of practicality. For this reason, at the inner surface 21, that is the one intended to interact with the outer surface of the axle 2, there are a plurality of grooves 22 extending transversally, i.e. in the direction of the width of the protecting element 20, orthogonally with respect to the sheet looking at FIGS. 2-4.

The transversal grooves 22 are parallel to each other and evenly located on the inner surface 21 of the protecting element.

Preferably, as shown in the example in the figures, the transversal grooves 22 are of a V-type; the Applicant found that a suitable value for the V-angle is about 20° and a suitable value for the depth of the grooves 22 is about 3 mm.

Thanks to the transversal grooves 22, the protecting element 20 can be easily folded on itself, i.e. manually bent to be effortlessly fitted on the outer surface of the axle 2 even by only one person.

In order to prevent the inner surface 21 of the protecting element 20 from adhering to the outer surface of the wheelset 2 during normal operation, prominences or ribs parallel to the grooves 22 protrude from the inner surface 21 of the protecting element. Although the prominences 23 shown in the figures are squared, in general the shape may be different.

In the example shown in the figures, the prominences 23 protrude about 1 mm from the surface 21 of the protecting element 20, have length of about 4 mm and their width spans from side to side of the protecting element 20.

When the protecting element 20 is correctly positioned on the axle 2, the prominences 23 are in abutment against the outer surface of the axle 2; an air chamber is then formed between the inner surface 21 of the protecting element and the outer surface of the axle 2. This air chamber actually facilitates air recirculation and prevents moisture stagnation which, in the long term, degrades the paint applied to the axle so much that corrosion is started.

The two ends of the protecting element have complementary shape so as to allow a shape coupling when the protecting element 20 is applied to the axle. In particular, the left end 24 is shaped as an upright L and the right end is shaped as a reversed L, as best shown in FIGS. 3 and 4. Thus, when the protecting element 20 is rolled up on the axle 2, the ends 23, 24 interlock with each other without creating a localized thickening, i.e. preventing the thickness from doubling due to two edges of the protecting element 20 overlapping to one another.

Figure 5:
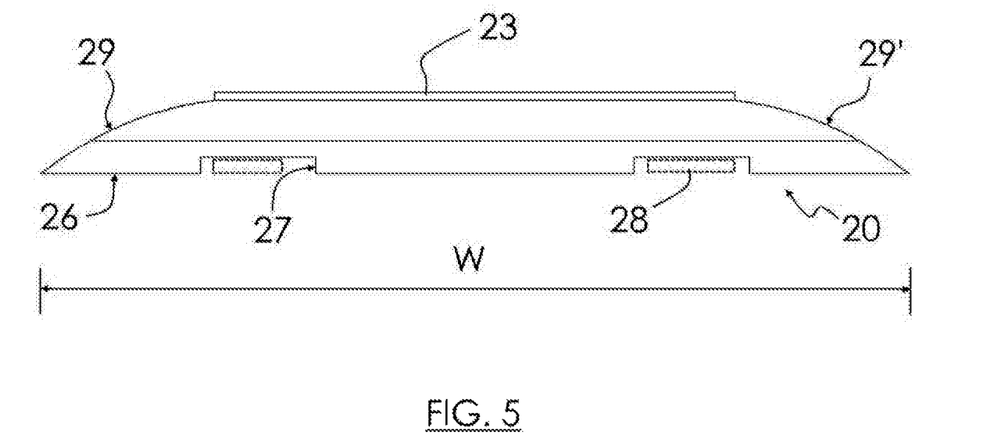
FIG. 5 is a front and elevation view of the protecting element shown in FIG. 2.

FIG. 5 shows the width of the protecting element 20. The width W conforms to the distance between the brake discs 5 and 6. At the outer surface 26, the one intended to remain visible to those observing the set wheel 1 and intended to interact with the ballast, there are two seats 27 intended to accommodate pipe clamps, locking clamps or similar mechanical devices 28 adapted to circumferentially lock the protecting element 20 around the axle 2.

In fact, once the protecting element 20 has been positioned on the axle, it is fastened by means of pipe clamps, or metal clamps or equivalent mechanical locking means, preferably provided with lowered flathead screws, which do not protrude beyond the outer surface 26. For the sake of simplicity, FIG. 1 shows the seats 27 of the protecting element 20 only.

As can be seen in FIG. 5, the side edges 29 and 29' are beveled with a bell profile. The reason can be easily guessed by looking at FIG. 1. The wheelset has curved radiusing surfaces either at a coupling journal for the coupling of the wheels 3, 4 or at the hub seats of the brake discs 5, 6; basically, the side edges 29 and 29' are shaped so as to adapt to these curved radiusing surfaces in a substantially complementary way, so that the latter are not exposed.

Figure 6:
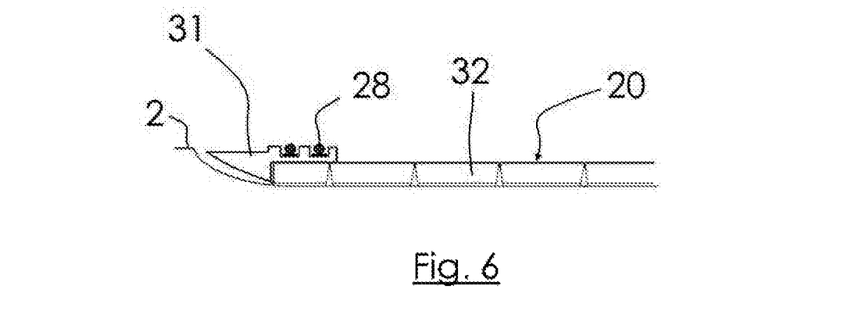
FIG. 6 is a schematic and partially sectional view of a protecting element according to the present invention, properly positioned on an axle and provided with diagonal grooves.
Figure 7:
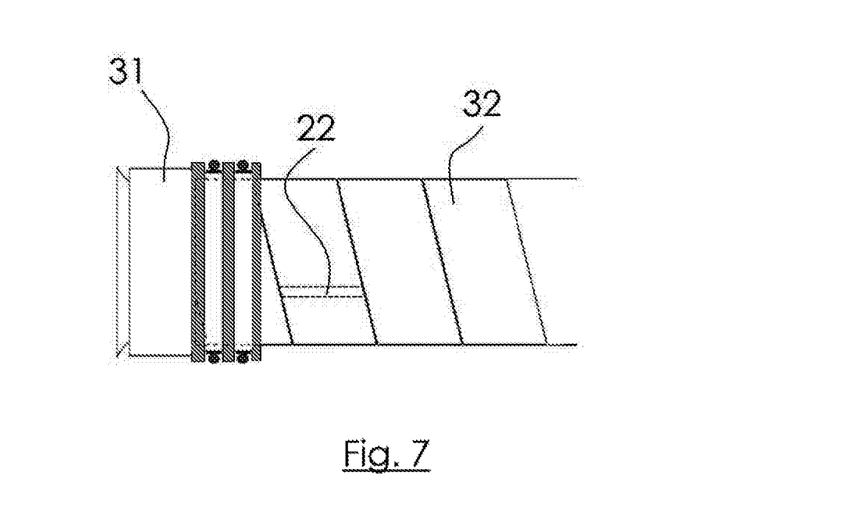
FIG. 7 is a schematic view of the protecting element shown in FIG. 6.

FIGS. 6 and 7 schematically show an alternative embodiment in which the grooves 22 are diagonal, i.e. inclined with respect to the longitudinal development of the pad. This embodiment, as evident from FIG. 7, allows axles characterized by large exposed surfaces to be effectively protected. In addition, the spiral-like inner ribs allow water and moisture to be centrifuged outwards, so that they are expelled.

In particular, as shown in FIG. 6, the pad having diagonal grooves 22 can be made in several portions, for example an end portion 31 shaped with a bell-like profile to fit the curved radiusing surfaces of the axle, and a central portion 32 provided with the grooves 22. In this way, the central portion 32 can be made with minimal thickness, which is useful in the case of limited space available—as in the case of drive wheelsets—and the end portion 31 which accommodates the pipe clamps 28 can be made thicker than the central portion 32 and in part may be overlapped thereon.

Among other things, if the protecting element 10, 20 or 30 is made up of several pieces 31, 32 as described above, more versatility can be achieved in adapting a protecting element to different types of wheelsets.

Figure 8:
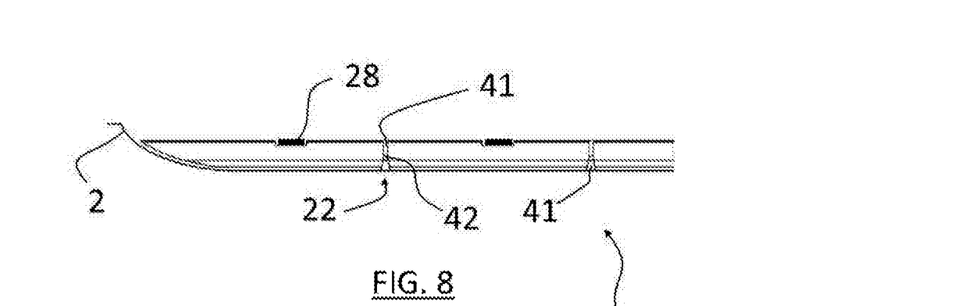
FIG. 8 is a schematic and partially sectional view of a protecting element according to the present invention, properly positioned on an axle and provided with straight (orthogonal) grooves.
Figure 9:
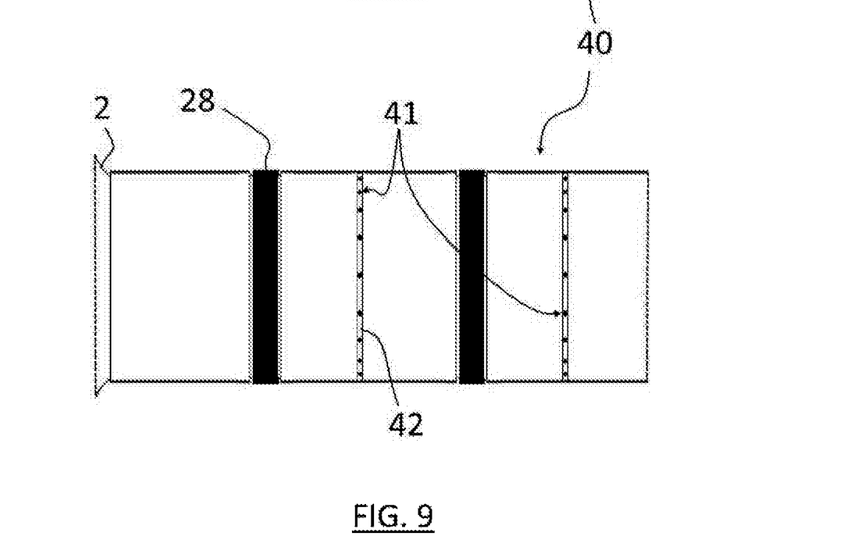
FIG. 9 is a schematic view of the protecting element shown in FIG. 8.

FIGS. 8 and 9 show another embodiment of a protecting element 40 according to the present invention. This is a protecting element with grooves 22 orthogonal to the rolling-up direction, and having a width W greater than 150 mm. In this case, the water may stagnate inside the protecting element installed on the axle 2, even if there are the grooves 22, precisely because the width W is remarkable and may be more difficult for the water to reach the edges and be expelled.

Therefore, in this embodiment 40 there are series of through holes 41 spaced out by 150 mm. The holes 41 act as drains for the water, which through them is expelled outwards, away from the axle 2.

Preferably, the diameter of the holes 41 ranges from 2 to 4 mm and they are arranged along the rolling up direction of the pad 40.

Preferably, the series of holes 41 are equidistant from each other.

If the holes were not to be made at each longitudinal groove 22 but rather every three or four grooves, in order to allow the water to reach the holes, it would also be possible to make an inner channel 42 connecting the holes 41 and having depth equal to or greater than that of the grooves 22. The holes 41 can be made on the pad by a cutter or drill.

The main advantages the protecting elements 10, 20, 30 and 40 offer are the following.

They can be economically produced, both because the mentioned material to make them is easily available on the market at low costs, and the method used to make them, which will be described below, is cost-effective.

They can be applied to wheelsets, and easily removed for the inspection of the wheelset, even by a single person and by simple tools.

They can be reused several times, for example they can be picked up from a dismantled wheelset and installed on a newly installed or an already operating wheelset 1.

They can be installed to protect wheelsets having axles painted with reduced thickness. By using the protecting elements 10, 20, 30 and 40, large thicknesses of the axle paint can be avoided, and this greatly simplifies inspection operations.

The protecting elements 10, 20, 30 and 40 are preferably obtained by rolling or extrusion. The obtained pads are cut to size. The transversal grooves 22, the transversal prominences 23, the beveled edges 29 and 29' and the seats 27 are obtained by subtractive machining, i.e. by removing material, for example by milling, and preferably in line with respect to rolling or extrusion.

The just described method allows to keep low production costs: in fact, unlike the solutions of the prior art, no molds are required.

In order to carry out the above described machining, common multi-axis machining centers can be used; alternatively, a custom machinery equipped with multiple milling cutters simultaneously machining the pad coming from the rolling mill or extruder, can be set up.

Thanks to this method, the protecting elements 10, 20, 30 and 40 can be made with their strength changing along the height, i.e., more toughness at the outer surface 26 and less at the inner one 21, for example by drawing or laminating two types of polypropylene.

The invention claimed is:

1. A protecting element (20) of an axle (2) of railway wheelset (1), the protecting element (20) comprising a pad, wherein the pad:
   has a thickness between 5 mm and 10 mm;
   is made of a material having high-strength, between 50 kJ/m$^2$ and 80 kJ/m$^2$;
   is provided with a plurality of transversal grooves (22), and
   can be rolled up on the axle (2) at room temperature.

2. The protecting element (20) according to claim 1, wherein the pad strength is 70 kJ/m$^2$.

3. The protecting element (20) according to claim 1, wherein the transversal grooves (22) are obtained at an inner surface (21) of the protecting element, the inner surface being configured to face an outer surface of the axle (2).

4. The protecting element (20) according to claim 1, wherein the transversal grooves (22) are V-shaped.

5. The protecting element (20) according to claim 4, wherein a V-angle is of about twenty degrees.

6. The protecting element (20) according to claim 1, wherein the transversal grooves (22) are parallel to each other and evenly spaced.

7. The protecting element (20) according to claim 1, further comprising a plurality of prominences (23) protruding from the inner surface (21) of the protecting element to move into abutment against the outer surface of the axle (2) and define an air chamber between the axle (2) and the protecting element (20) itself.

8. The protecting element (20) according to claim 7, wherein the prominences (23) are transversal ribs parallel to each other and in-between two consecutive transversal grooves (22).

9. The protecting element (20) according to claim 1, wherein the side edges (29, 29') are beveled or rounded for adapting to curved surfaces of the axle (2).

10. The protecting element (20) according to claim 1, further comprising at least one seat (27) obtained at the outer surface (26) opposite to the inner surface (21) and configured to accommodate pipe clamps (28) or other fastening elements to fasten the protecting element on the axle (2).

11. The protecting element (20) according to claim 1, wherein the ends (24, 25) of the pad have undercuts with complementary shape in order to overlap one another, when the protecting element is assembled on the axle, the overall thickness remaining unchanged.

12. The protecting element (20) according to claim 1, wherein the protecting element (20) is made up of high-density polyethylene HDPE.

13. The protecting element (20) according to claim 1, further comprising at least one of: pipe clamps (28) or other mechanical fastening systems circumferentially clamping the pad on the axle (2).

14. The protecting element (20) according to claim 1, wherein the transversal grooves (22) are orthogonal to the longitudinal development of the pad, or are tilted so that a spiral path is obtained when the protecting element (20) is rolled up on an axle.

15. The protecting element (20) according to claim 1, further comprising at least one or more separate end portion (31) shaped to adapt to curved surfaces of the axle (2), at the radiusing areas, and to be at least partially overlapped to said pad in turn rolled up on the axle in order to lock it, and further comprising a fastener (28) to fasten the end portions (31) to the axle (2).

16. The protecting element (20) according to claim 1, further comprising a plurality of through-holes (41) independent or connected to a channel (42), the through-holes (41) configured to allow water to be discharged when the protecting element is rolled up on the axle (2).

17. A method for making a protecting element (20) to protect an axle (2) of a railway wheelset (1), comprising the steps of:
   (a) rolling or extruding a pad whose thickness is between 5 mm and 10 mm and whose strength is between 50 kJ/m$^2$ and 80 kJ/m$^2$, made of high-density polyethylene HDPE;
   (b) making a plurality of grooves (22) on the surface of the pad intended for facing the outer surface of the axle, wherein the grooves (22) extend transversally with respect to the pad length and allow the pad to be manually folded, by only one person, to be rolled up on the axle (2).

18. The method according to claim 17, wherein the transversal grooves (22) are parallel to each other and evenly spread.

19. The method according to claim 17, wherein the transversal grooves (22) are V-shaped, with an angle of about 20°.

20. The method according to claim 17, wherein the transversal grooves (22) are orthogonal to the longitudinal development of the pad, or are tilted so that a spiral pattern is obtained when the protecting element (20) is rolled up on an axle (2).

21. The method according to claim 17, further comprising the step of:
   (c) making a plurality of prominences (23) protruding from a same surface (21) of the protecting element in which there are the grooves (22), in order to be moved into abutment against the outer surface of the axle (2) and define an air chamber between the axle (2) and the protecting element (20) itself.

22. The method according to claim 17, further comprising the step of:
   (d) beveling or rounding the side edges (29, 29') of the pad so that the protecting element (20) can fit together with a curved surfaces of the axle (2), thus protecting the axle (2).

23. The method according to claim 17, further comprising the step of:
   (e) obtaining one or more seats (27) at the pad surface (26) configured to face a side opposite to an outer surface of the axle, which are configured to accommodate pipe clamps (28) or other fastening elements to fasten the protecting element on the axle (2).

* * * * *